United States Patent [19]

Kawamura et al.

[11] Patent Number: 5,075,865
[45] Date of Patent: Dec. 24, 1991

[54] METHOD AND APPARATUS FOR INVOLUTE INTERPOLATION

[75] Inventors: Hideaki Kawamura, Hachioji; Kentaro Fujibayashi, Musashino; Masafumi Sano, Minamitsuru, all of Japan

[73] Assignee: Fanuc, Ltd., Minamitsuru, Japan

[21] Appl. No.: 397,462

[22] PCT Filed: Jan. 6, 1989

[86] PCT No.: PCT/JP89/00007

§ 371 Date: Aug. 22, 1989

§ 102(e) Date: Aug. 22, 1989

[87] PCT Pub. No.: WO89/06393

PCT Pub. Date: Jul. 13, 1989

[30] Foreign Application Priority Data

Jan. 8, 1988 [JP] Japan .................................. 63-2145

[51] Int. Cl.$^5$ .......................................... G05B 19/403
[52] U.S. Cl. ................... 364/474.31; 318/573; 364/474.36
[58] Field of Search ..................... 364/474.29, 474.31, 364/474.36; 318/573; 51/287, 126 G

[56] References Cited

U.S. PATENT DOCUMENTS

| | | | |
|---|---|---|---|
| Re. 28,559 | 9/1975 | Villano | 409/131 |
| Re. 28,766 | 4/1976 | Villano | 318/573 X |
| 3,714,865 | 2/1973 | Villano | 318/573 |
| 3,766,369 | 10/1973 | Watanabe et al. | 364/474.05 X |
| 4,381,608 | 5/1983 | Thormann et al. | 33/1 M |
| 4,922,741 | 5/1990 | Bridges et al. | 72/301 |
| 4,935,681 | 6/1990 | Kawamura et al. | 318/569 |

*Primary Examiner*—Joseph Ruggiero
*Attorney, Agent, or Firm*—Staas & Halsey

[57] ABSTRACT

An involute interpolation method for a computerized numerical control apparatus having a rotational axis and a linear axis is effected by giving commands for a direction in which an involute curve (IC) rotates, the position of the center of a base circle (BC), and the radius (R) of the base circle, and interpolating the involute curve (IC) according to the commands. Interpolated distances are converted to those along the rotational axis and the linear axis for the control of a machine tool (9).

5 Claims, 3 Drawing Sheets

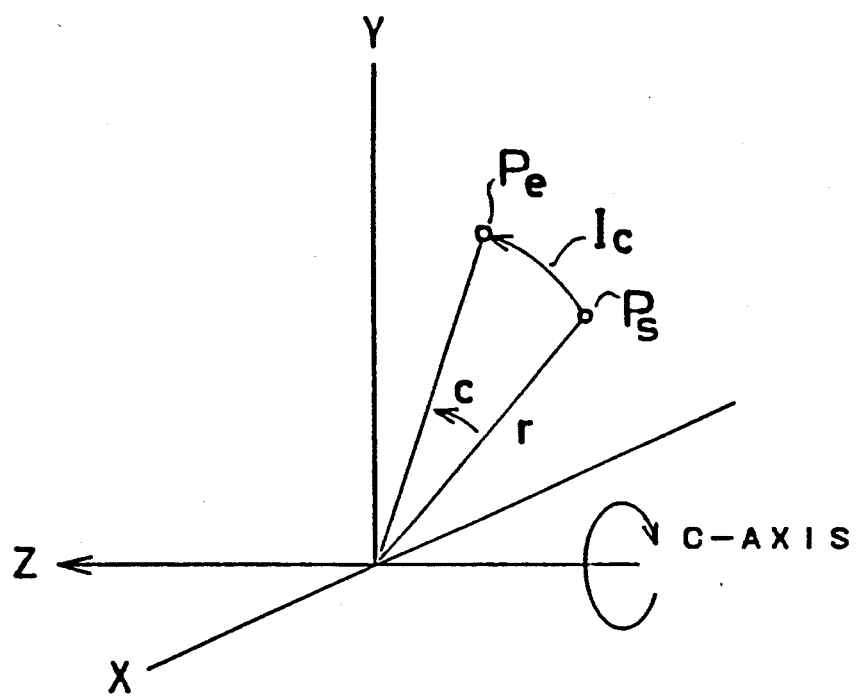
F I G. 3

METHOD AND APPARATUS FOR INVOLUTE INTERPOLATION

CROSS REFERENCE TO RELATED APPLICATIONS

This application is related to U.S. application Ser. Nos. 07/309,669, U.S. Pat. Nos. 4,899,096, 07/309,664, U.S. Pat. No. 4,926,102, and 07/408,501.

BACKGROUND OF THE INVENTION

1. Field of the Invention

The present invention relates to a method of involute interpolation for a computerized numerical control apparatus having a rotational axis and a linear axis, and more particularly to a method of involute interpolation for use on a three-axis lathe, a grinding machine, or the like.

2. Description of Related Art

There is a great need for the interpolation of involute curves in numerical control apparatus or the like in order to machine gears, pump impellers, or the like. It has been general practice to interpolate an involute curve with a computer or an NC programming device separate from a computerized numerical control apparatus, convert the interpolated data to linear data on a tape, and machine a workpiece under numerical control using the tape.

The applicant has proposed an involute interpolation method by which an involute curve can easily be interpolated with commands in an orthogonal coordinate system within a computerized numerical control (CNC) apparatus (see Japanese Patent Application No. 62-157303).

The machine coordinate system of a three-axis lathe or a cam grinding machine having a C-axis is a polar coordinate system. The above involute interpolation method employing an orthogonal coordinate system cannot be applied to these machines.

SUMMARY OF THE INVENTION

In view of the aforesaid drawback of the earlier involute interpolation method, it is an object of the present invention to provide an involute interpolation method for use on a three-axis lathe, a grinding machine, or the like.

To achieve the above object, there is provided in accordance with the present invention an involute interpolation method for a computerized numerical control apparatus having a rotational axis and a linear axis, comprising the steps of giving commands for a direction in which an involute curve rotates, the position of the center of a base circle, and the radius (R) of the base circle. The desired curve is then interpolated according to the commands. The rotational axis and the linear axis of a machine are then controlled according to the interpolated curve.

The commands for the involute curve are interpolated in a computerized numerical control (CNC) apparatus, and the interpolated distances are converted to those on the rotational and linear axes for the control of a machine tool.

BRIEF DESCRIPTION OF THE DRAWINGS

FIG. 3 is a diagram of the relationship between an orthogonal coordinate system and a polar coordinate system.

DESCRIPTION OF THE PREFERRED EMBODIMENTS

An embodiment of the present invention will hereinafter be described with reference to the drawings.

FIG. 3 shows the relationship between an orthogonal coordinate system and a polar coordinate system of a machine having a linear axis and a rotational axis, such as a three-axis lathe or the like. An X-axis represents the direction of a cross slide, and a Z-axis is the same as the direction of the axis of a spindle. The machine has a radial linear axis, a Z-axis, and a C-axis which is a rotational axis around the Z-axis.

A program employs X- and Y-axes, and gives commands for an involute curve on the XY plane. The commands and movement of the machine are the same along the Z-axis. Therefore, the program is commanded on the XY plane, and is interpolated in the coordinate system on the XY plane. Interpolation pulses are converted to pulses in a polar coordinate system, i.e., on an r-c plane, and servomotors are driven by the converted pulses to control the machine.

Figure 1:
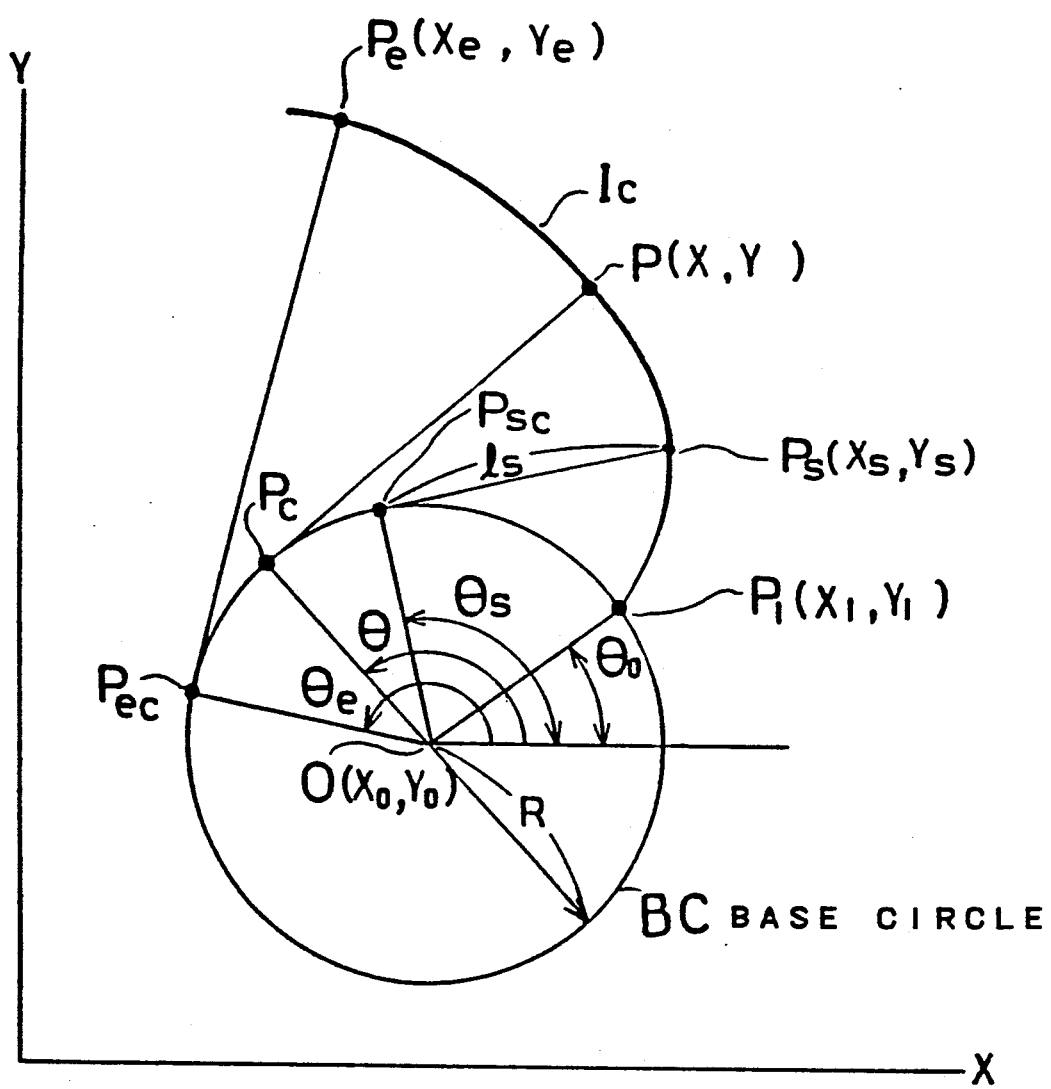
FIG. 1 is a diagram of an involute curve to be interpolated according to an embodiment of the present invention.

Actual commands and interpolation of an involute curve will be described below. FIG. 1 shows, by way of example, an involute curve to be interpolated according to the embodiment of the present invention. As described above, the involute curve is commanded as an involute curve on the XY plane. BC represents the base circle of the involute curve with its center having coordinates O ($X_0$, $Y_0$), and R indicates the radius of the base circle.

IC indicates an involute curve to be interpolated, and the involute curve IC starts at a point $P_1$ ($X_1$, $Y_1$). A line interconnecting the point $P_1$ and the center O forms an angle $\Theta_0$ with the X-axis.

The desired curve is an involute curve to be interpolated from a starting point Ps (Xs, Ys) on the involute curve IC to an ending point Pel (Xe, Ye).

Now, a line is drawn from the point Ps (Xs, Ys) tangentially to the base circle BC at a point Psc. A line interconnecting the point Psc thereon and the center O forms an angle $\Theta$s with the X-axis. Likewise, a line is drawn from the point Pe (Xe, Ye) tangentially to the base circle BC at a point Pec thereon. A line interconnecting the point Pec and the center O forms an angle $\Theta$e with the X-axis. A line is drawn from a point P (X, Y) on the involute curve being interpolated tangentially to the base circle BC at a point Pc (Xc, Yc). A line interconnecting the point Pc and the center O forms an angle $\Theta$ with the X-axis.

Commands for interpolating the involute curve are given as:

G12.1;

G03.2X -- C -- I -- J -- R -- F -- ;

G13.1;

G12.1 is a polar coordinate interpolation command which is a modal command. After this G code is commanded, the polar coordinate interpolation remains effective until the G code is canceled.

G03.2 is a counterclockwise involute curve command. If the involute curve were clockwise, it would be commanded by G02.2. Whether the involute curve goes toward or away from the base circle depends on the coordinates of the starting and ending points of the involute curve.

X denotes the coordinates of the ending point in an orthogonal coordinate system (X, C), and C denotes the coordinates of the ending point in the orthogonal coordinate system, which is Pe (Xe, Ye) in FIG. 1. The coordinates are commanded as absolute values. The numerical values following C are commanded as Y-axis values in the XY plane, and hence are different from an actual amount by which the C-axis rotates. After the involute curve has been interpolated, these values are converted to values in the polar coordinate system.

I -- J -- represents the values of the center of the base circle BC as viewed from the starting point Ps (Xs, Ys), and is commanded by incremental values.

R -- represents the radius of the base circle BC, and F -- the speed of feed.

G13.1 is a command for canceling the polar coordinate interpolation mode. When this code is given, the polar coordinate interpolation mode is canceled, and control goes back to the normal orthogonal coordinate interpolation. The mark; indicates the end of a block.

A calculation process for determining values required for the involute curve from the above commands will be described below.

(1) The central coordinates C of the base circle:

The coordinates of the starting point Ps (Xs, Ys) of the involute curve are not contained in commands, but are stored as a present position in a computerized numerical control apparatus. The coordinates O (X₀, Y₀) of the center of the base circle are determined from the starting points Ps (Xs, Ys) and a distance (I, J) to the center of the base circle of the involute curve as viewed from the starting point according to the following equations:

$$X_0 = X_s + I$$

$$Y_0 = Y_s + J$$

(2) The angle Θs for the starting point of the involute curve:

A line is drawn from Ps (Xs, Ys) tangentially to the base circle BC at a point Psc, and the angle formed between a line interconnecting the point Psc and the center O and the X-axis is indicated as Θs.

(3) The angle Θe for the ending point of the involute curve:

A line is drawn from Pe (Xe, Ye) tangentially to the base circle BC at a point Pec, and the angle formed between a line interconnecting the point Pec and the center O and the X-axis is indicated as Θe.

(4) The angle Θo for the starting point of the involute curve.

If it is assumed that the distance between the points Psc and Ps is represented by ls, then the length of the arc between the points Psc and P₁ is equal to the length of the straight line ls because of the definition of the involute curve. Therefore, if the length of the straight line ls is indicated by L, then the angle Θo for the starting point of the involute curve can be determined by:

$$\Theta_o = \Theta_o - L/R \text{ (radian)}$$

(5) From the above values, the coordinates of a point on the involute curve are given as follows:

$$X = R \{\cos \Theta + (\Theta - \Theta_0)\sin \Theta\} + X_0$$

$$Y = R \{\sin \Theta - (\Theta - \Theta_0)\cos \Theta\} + Y_0$$

By incrementing 8 a certain angle from Θs to Θe, successively determining points on the involute curve IC according to the above equations, and linearly interpolating the points, an involute curve can be determined and interpolated. Interpolation along the Z-axis in synchronism therewith can result in interpolation of the curve to be determined.

A desired involute curve can be interpolated by incrementing Θ by certain angles in the above equations, determining three points, and interpolating them by circular interpolation.

In the above description, specific commands and interpolation formulas have been explained. Basically, it is sufficient to command the direction in which an involute curve rotates, the distance by which it moves, the radius of a base circle, and the coordinates of the center of the base circle. Various formulas can be used depending on the nature of the commands. The distance by which an involute curve moves may be commanded by way of an angle through which it moves, as viewed from the center of the base circle.

In the above embodiment, the involute curve turns counterclockwise away from the base circle. However, the involute curve may turn counterclockwise toward the base circle, clockwise toward the base circle, or clockwise away from the base circle. The above equations are applicable to any of these three instances.

The interpolation pulses thus obtained on the XY plane are then converted to values on the r-S plane according to the following equations:

$$r = \sqrt{X^2 + Y^2}$$

$$c = \cos^{-1} (X/\sqrt{X^2 + Y^2}) \pm 2n\pi \text{ (n is an integer)}$$

Figure 2:
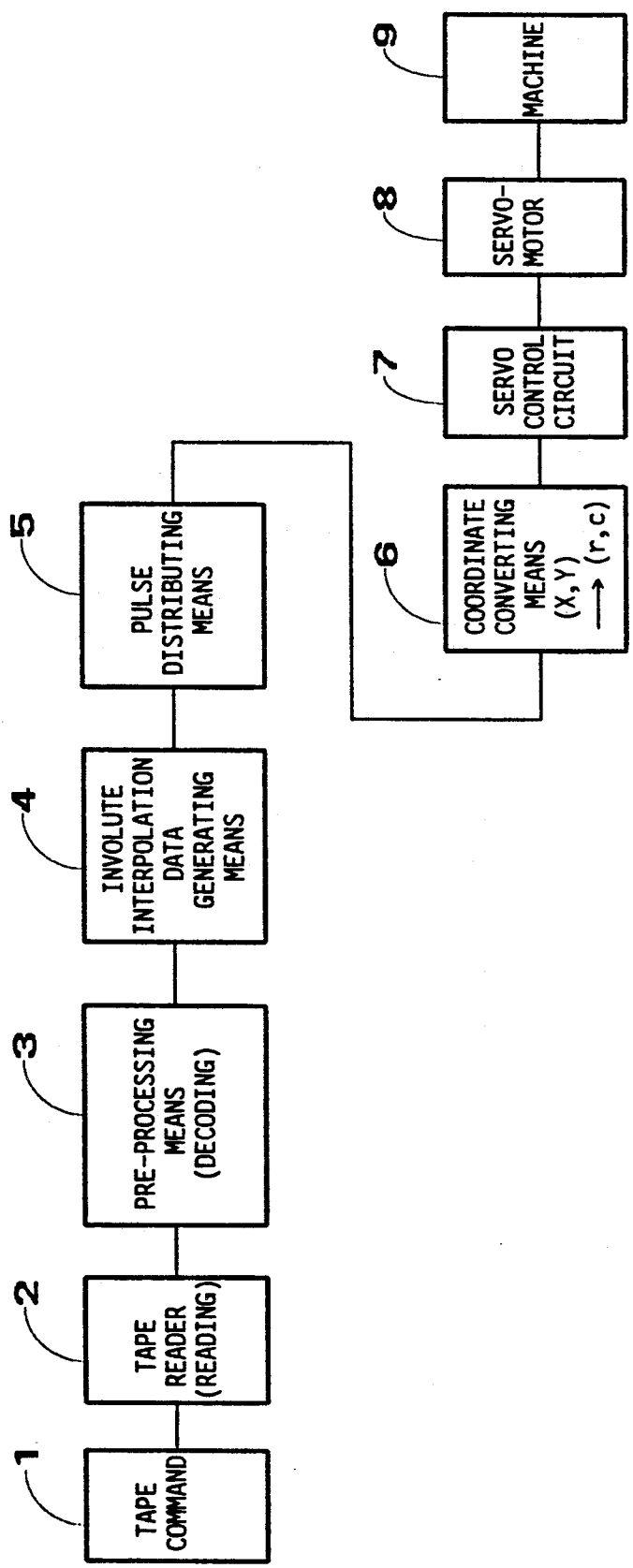
FIG. 2 is a block diagram of a numerical control apparatus used for carrying out the embodiment of the present invention.

A computerized numerical control apparatus for effecting the above involute curve interpolation will be described below. FIG. 2 schematically shows the computerized numerical control apparatus. The computerized numerical control apparatus includes a tape command 1 in the form of a tape in which the above commands are punched, a tape reader 2 for reading the tape 1, a pre-processing means 3 for determining from G codes whether there is an involute interpolation command, and an involute interpolation data generating means 4 for generating from commands data necessary for effecting the involute interpolation as described above. A pulse distributing means 5 for incrementing Θ by certain angles to determine points of an involute curve and a distance of movement along the Z-axis from the data generated in the orthogonal coordinate system by the involute interpolation data generating means 4. The pulse distributing means 5 also effects linear or circular interpolation on the determined points and distance, and issues interpolation pulses. The computerized numerical control apparatus also includes a coordinate converting means 6 for converting the interpolation pulses (X, Y) in the orthogonal coordinate system to interpolation pulses (r, c) in the polar coordinate system, and a servo control circuit 7 for driving servomotors 8 with the commands to cause ball screws or the like to move a machine 9.

With the present invention, as described above, commands for an involute curve are interpolated in the computerized numerical control (CNC) apparatus, and the interpolated quantities are converted to those on the rotational and linear axes for controlling a machine tool. Accordingly, a workpiece can easily be machined along a three-dimensional involute curve on a three-axis lathe, a cam grinding machine, or the like.

What is claimed is:

1. An involute interpolation method for a computerized numerical control apparatus having a rotational axis and a linear axis, comprising the steps of:
   giving commands for a direction in which an involute curve rotate, a position of the center of a base circle, and a radius (R) of the base circle;
   interpolating the involute curve and a distance along a Z-axis according to the commands; and
   controlling the rotational axis and the linear axis of a machine in response to said interpolating step.

2. An involute interpolation method according to claim 1, wherein said step of giving commands comprises giving commands in an orthogonal coordinate system, and wherein said interpolating step comprises interpolating the commands in orthogonal coordinates, further comprising the step of:
   converting an interpolated distance in the orthogonal coordinate system to a distance of movement in a polar coordinate system after said interpolating step.

3. An involute interpolation apparatus for a computerized numerical control apparatus having a rotational axis and a linear axis, comprising:
   means for providing commands which define a two-dimensional involute curve, the commands comprising a direction in which an involute curve rotates, a position of a center of a base circle for locating the involute curve in a two-dimensional plane, and a radius (R) of the base circle which defines a size of the involute curve in the two-dimensional plane;
   means for interpolating the involute curve according to the commands; and
   means for controlling the rotational axis and the linear axis according to the involute curve.

4. An involute interpolation apparatus according to claim 3, wherein said means for providing commands comprises means for providing commands in an orthogonal coordinate system, and wherein said means for interpolating comprises means for interpolating the involute curve in orthogonal coordinates, further comprising a means for converting the interpolated curve in orthogonal coordinates to an involute curve in a polar coordinate system.

5. An involute interpolation method for a computerized numerical control apparatus having a rotational axis and a linear axis, comprising the steps of:
   giving commands which define an involute curve;
   interpolating the involute curve in X and Y dimensions according to said commands to provide interpolated values;
   converting the interpolated values in the X and Y dimensions into R and C dimensions to provide converted interpolated values; and
   controlling said rotational axis and said linear axis according to said transformed interpolated values.

* * * * *

UNITED STATES PATENT AND TRADEMARK OFFICE
CERTIFICATE OF CORRECTION

PATENT NO. : 5,075,865
DATED : December 24, 1991
INVENTOR(S) : Kawamura et al.

It is certified that error appears in the above-identified patent and that said Letters Patent is hereby corrected as shown below:

Col. 3, line 62, change "ls," to --$\dot{i}$s,--;

Col. 3, line 64, change "ls," to --$\ell$s,--;

Col. 3, line 66, change "ls," to --$\ell$s,--.

Col. 4, line 9, change "8" to --$\theta$--;

Col. 4, line 38, change "r-S" to --r-c--.

Col. 5, line 21, change "rotate" to --rotates--.

Signed and Sealed this

Twentieth Day of April, 1993

Attest:

MICHAEL K. KIRK

Attesting Officer    Acting Commissioner of Patents and Trademarks